(12) United States Patent
Walden

(10) Patent No.: US 8,710,414 B2
(45) Date of Patent: Apr. 29, 2014

(54) ROTATING SUNLIGHT/LIGHT BEAM FOR FRACTIONAL/BENEFICIAL USE

(76) Inventor: Jack O'Neal Walden, Tucson, AZ (US)

(*) Notice: Subject to any disclaimer, the term of this patent is extended or adjusted under 35 U.S.C. 154(b) by 431 days.

(21) Appl. No.: 12/563,213

(22) Filed: Sep. 21, 2009

(65) Prior Publication Data

US 2010/0084017 A1    Apr. 8, 2010

Related U.S. Application Data

(60) Provisional application No. 61/195,478, filed on Oct. 8, 2008, provisional application No. 61/210,698, filed on Mar. 23, 2009, provisional application No. 61/214,463, filed on Apr. 24, 2009.

(51) Int. Cl.
*G01C 21/02*    (2006.01)
*F24J 2/08*    (2006.01)
*H02N 6/00*    (2006.01)

(52) U.S. Cl.
USPC .................. 250/203.4; 126/684; 136/246

(58) Field of Classification Search
USPC ............... 250/203.4; 136/246, 251, 259, 243, 136/244; 126/576, 605, 684, 573, 600, 683, 126/685, 696

See application file for complete search history.

(56) References Cited

U.S. PATENT DOCUMENTS

| 4,131,485 | A | * | 12/1978 | Meinel et al. | 136/259 |
| 5,371,660 | A | * | 12/1994 | Levens | 362/552 |
| 2011/0100456 | A1 | * | 5/2011 | Walden | 136/259 |

* cited by examiner

*Primary Examiner* — Kevin Pyo
*Assistant Examiner* — Don Williams
(74) *Attorney, Agent, or Firm* — Peter B. Goldman

(57) ABSTRACT

The Sun, a giant laser, being 93 million miles from Earth, is the greatest point-source light in existence. The light-rays emanating from the Sun as photons traveling 93 million miles in distance, is a nearly-perfectly collimated light form. The intent of this invention is to capture those highly collimated light-ray photons and gently redirect them in several directions, while greatly compounding them, and keeping them in a highly parallel form to be delivered to the final destination. This invention is supported by a second source light, in which the Sun's location is replaced by the HID element in a newly invented form for capturing and compounding the light-rays. Compounding for both sources can be as great as desired.

2 Claims, 9 Drawing Sheets

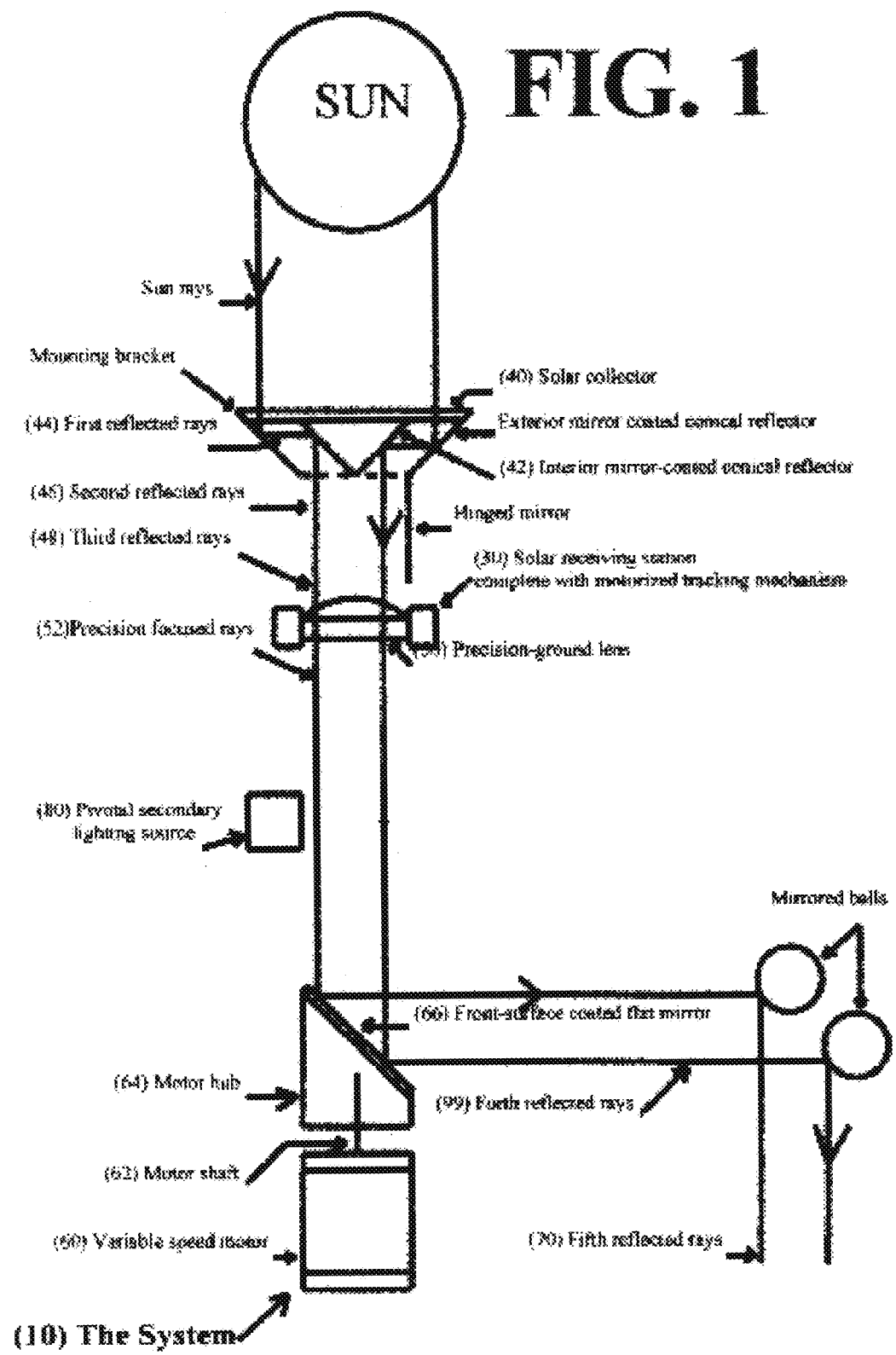

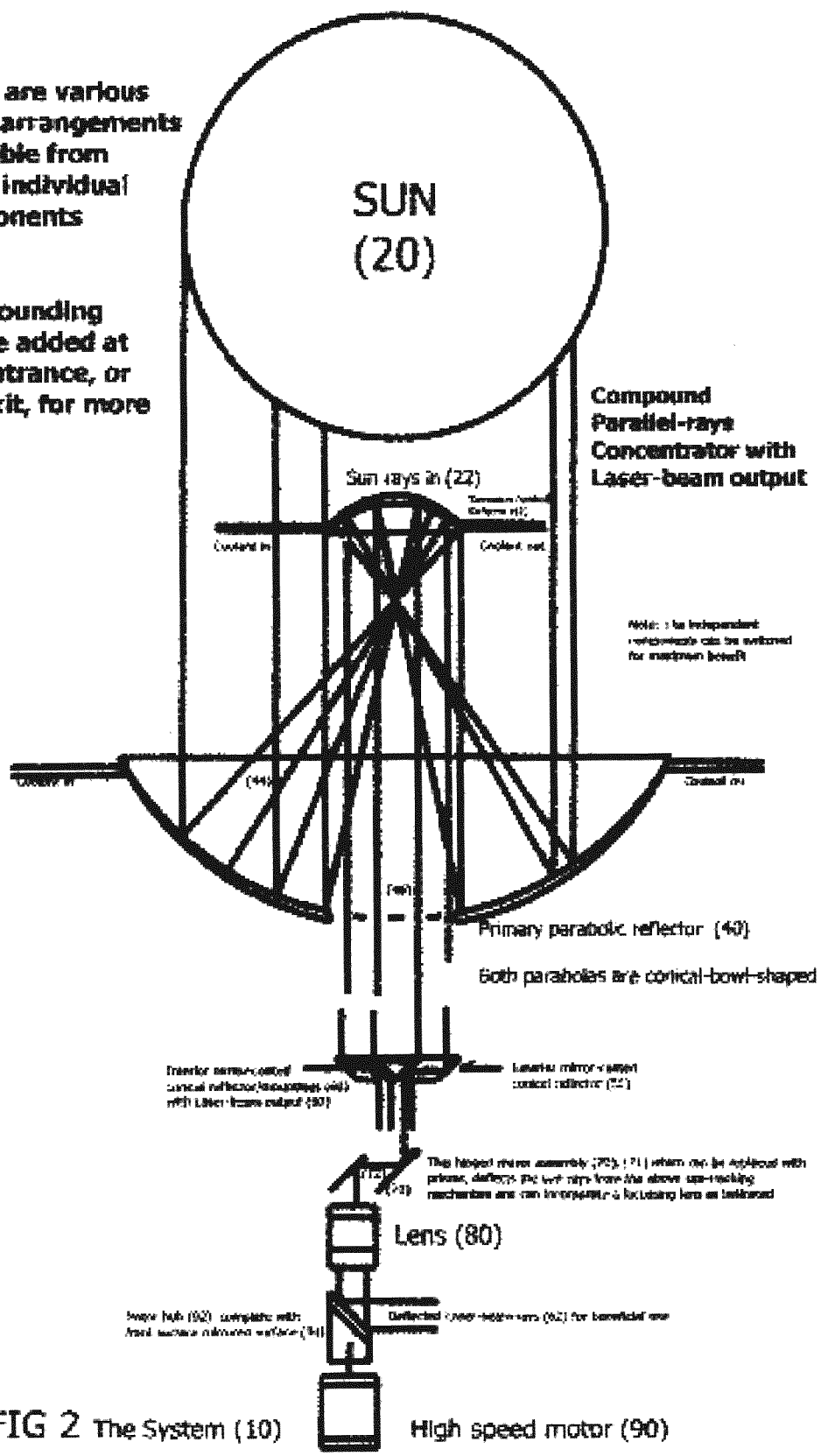
FIG 2 The System (10)

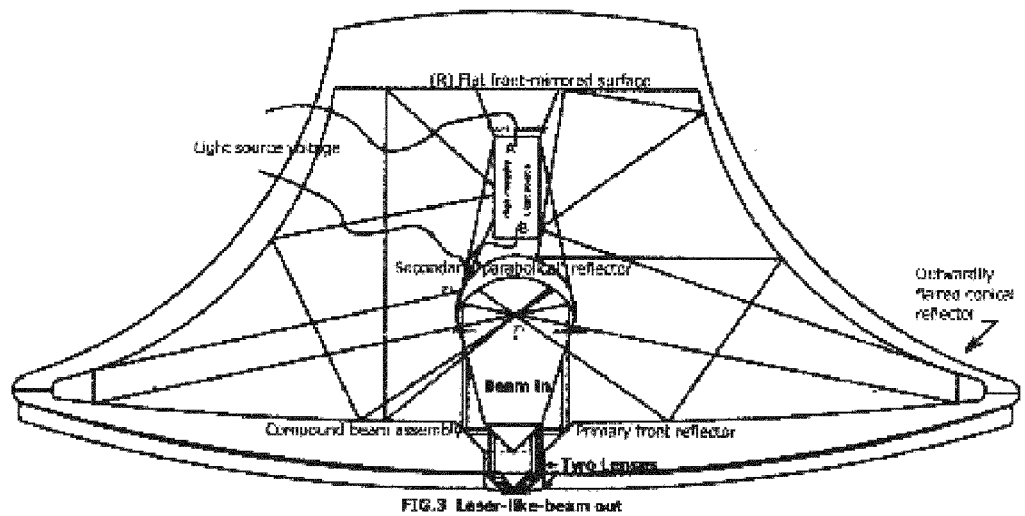
FIG.3 Enlarged view showing details of Double Lens assembly and possible mounting details

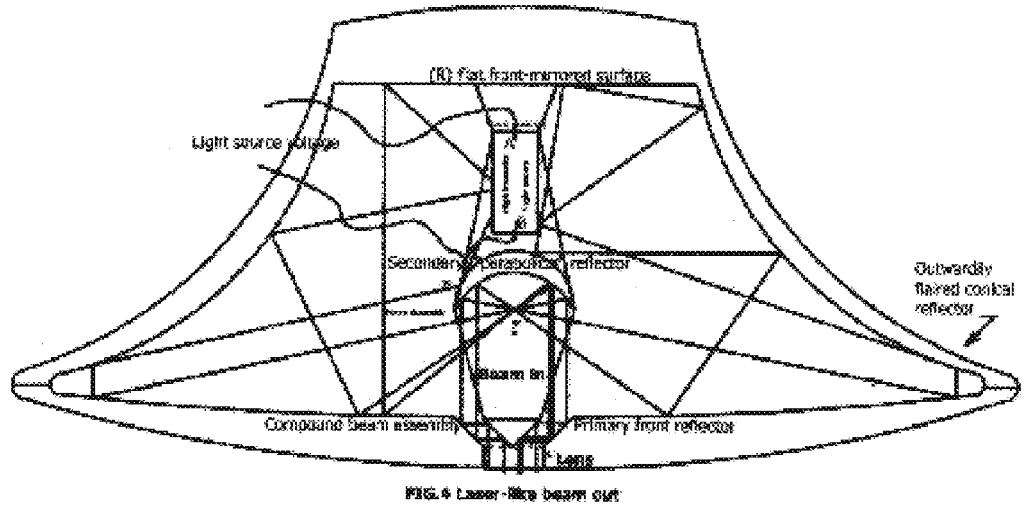
FIG.4 Enlarged view showing details of Single Lens assembly and possible mounting details
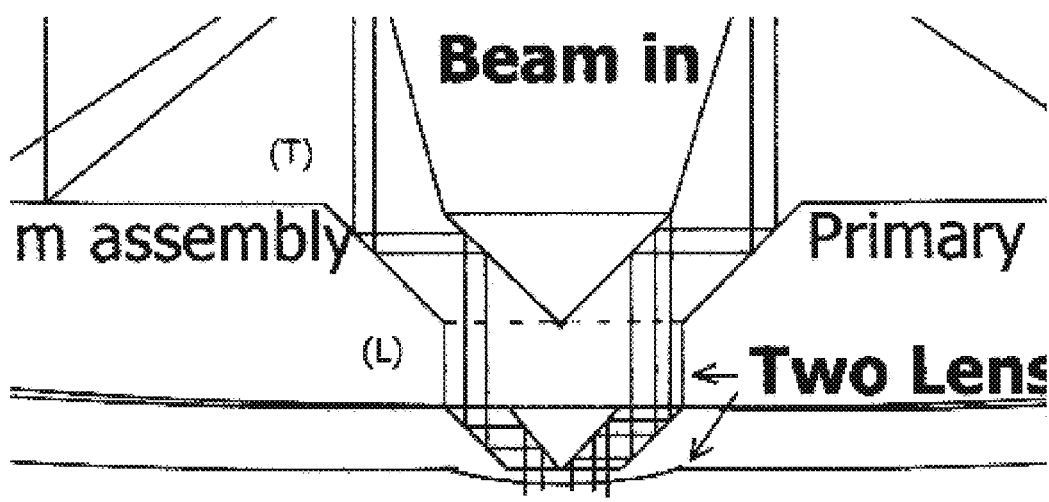
FIG.5 Enlarged view showing details of Double Lenses assembly details

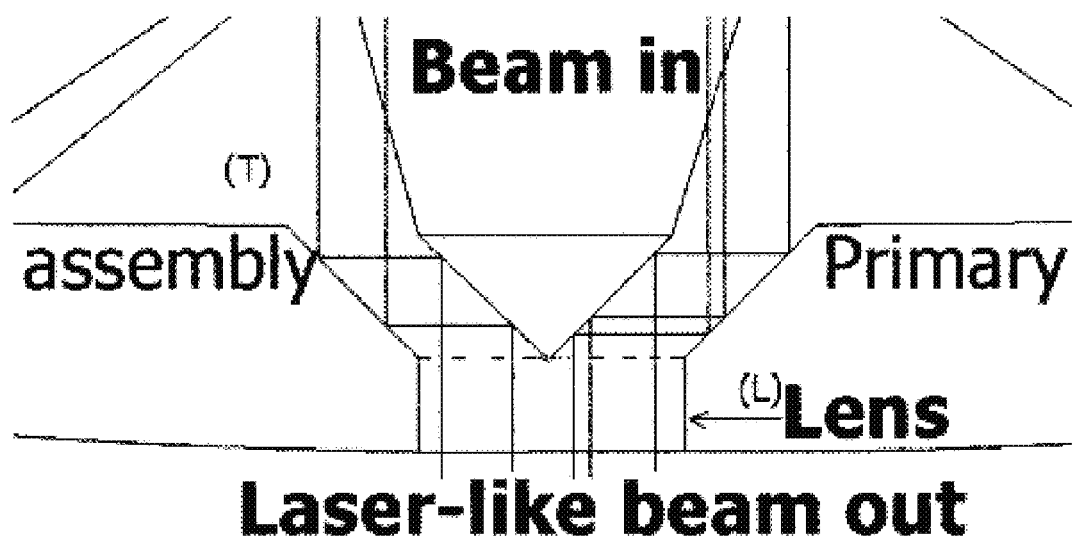
FIG. 6 Enlarged view showing details of Single Lens assembly and possible mounting details
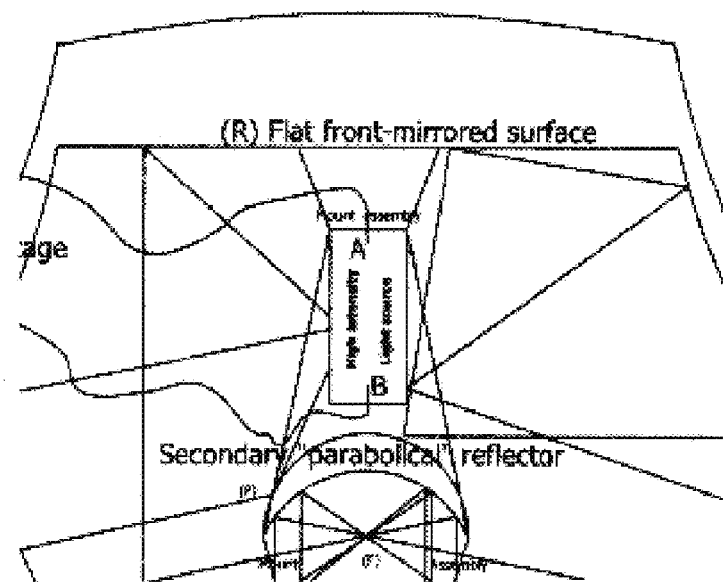
FIG. 7 Light source and parabolic reflector with mounting details

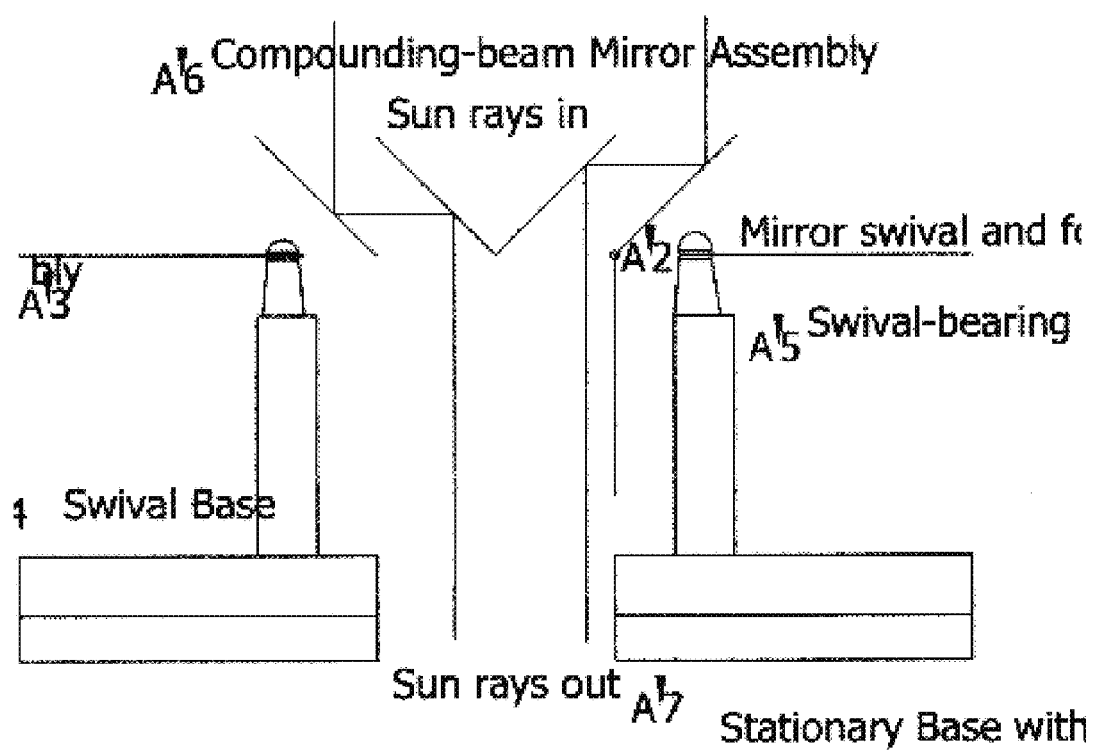
FIG. 8 Schematic of details of the solar collector Mount mechanism

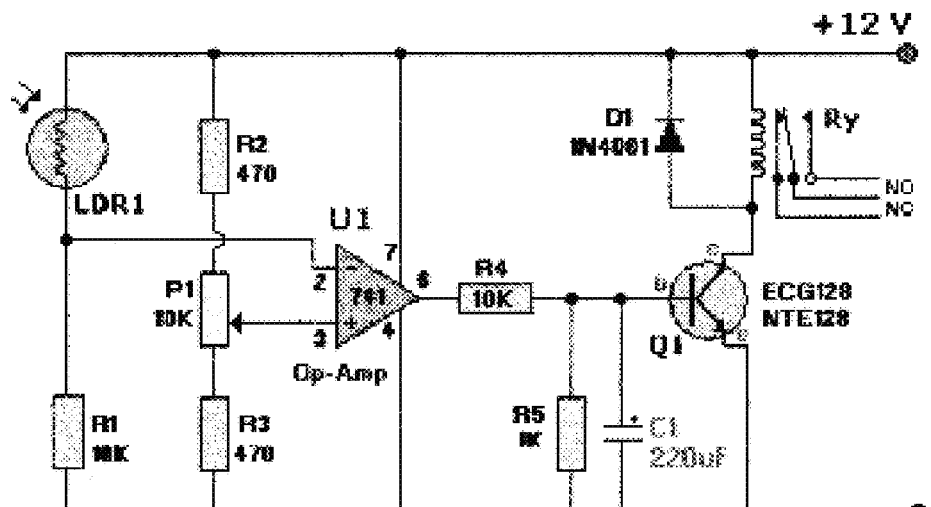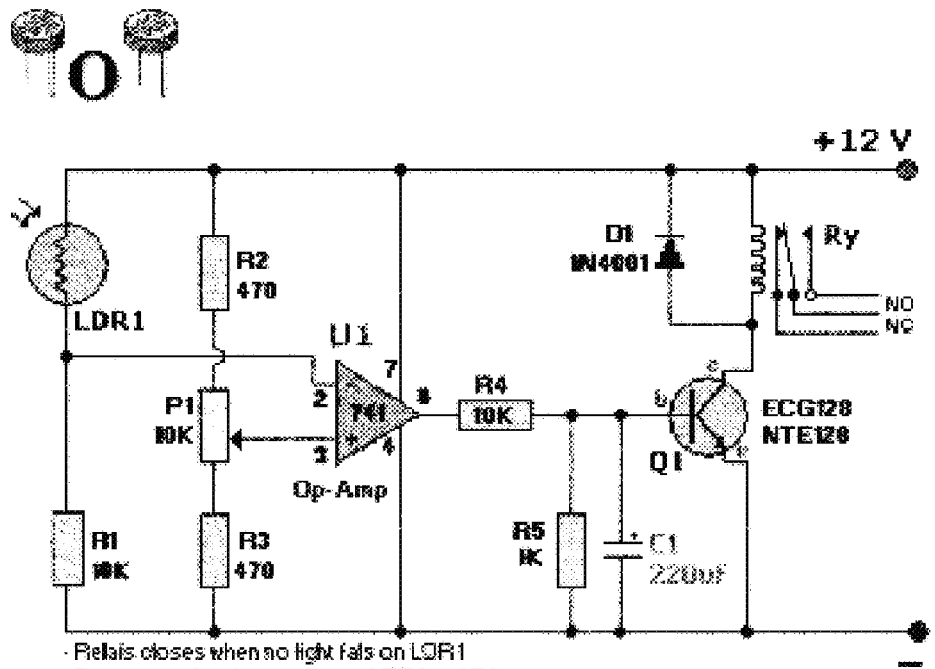
FIG.9 LDR's with Sun Spot indication in close proximity to the two LDR photocells

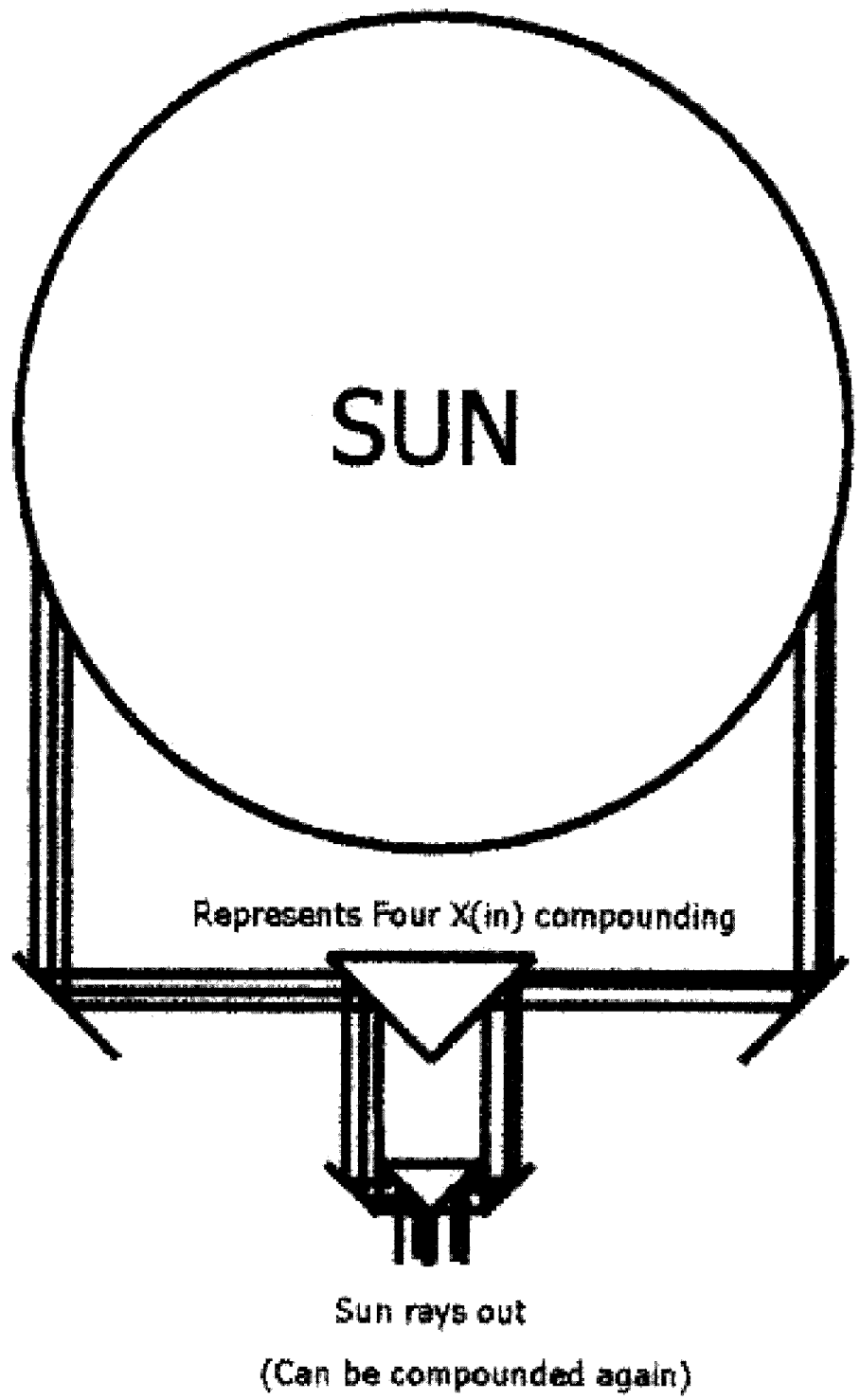
FIG. 10 The above drawing represents four times compounding of the Sun's rays

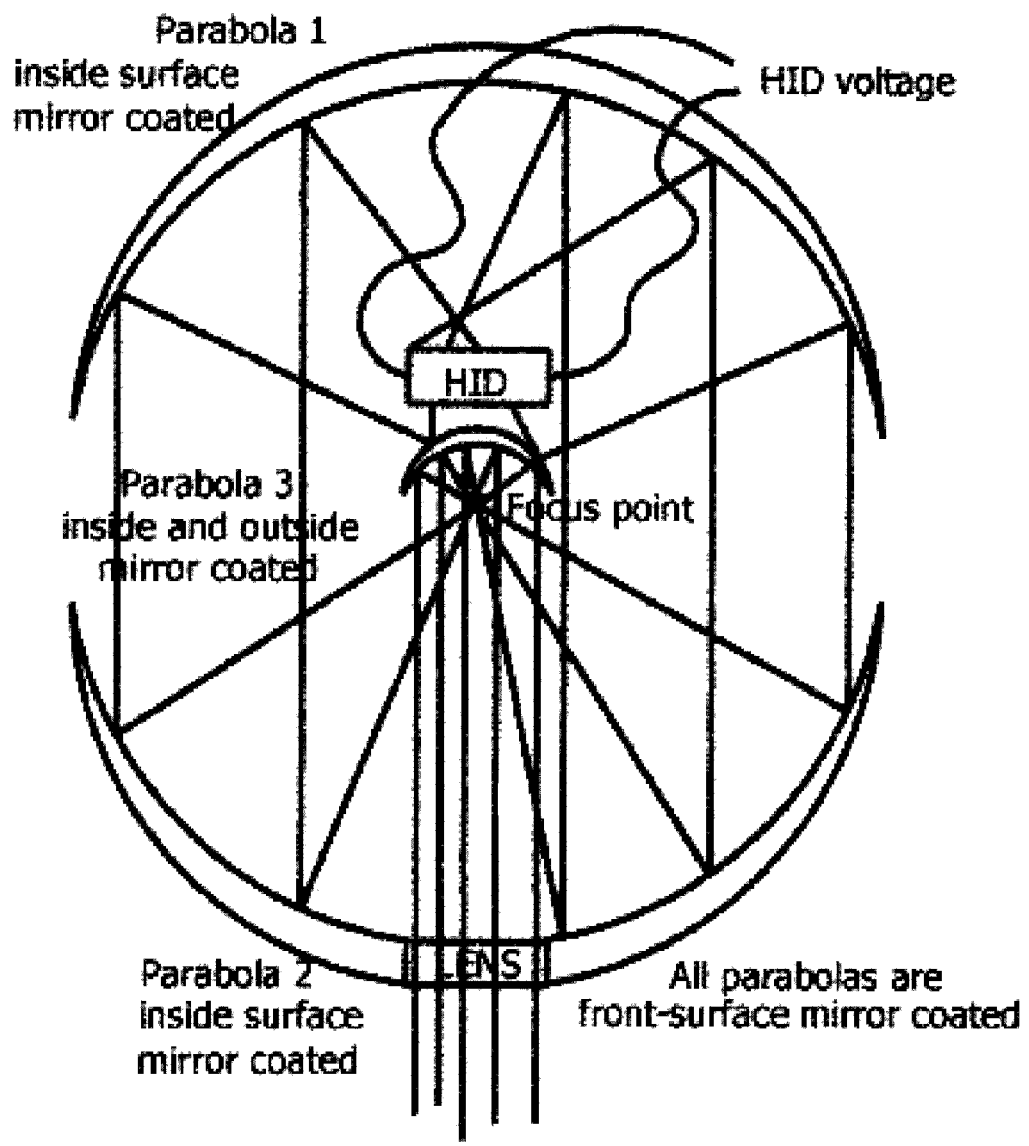
FIG. 11, this is illustrating the use of three Parabolas for the same end purpose.

ROTATING SUNLIGHT/LIGHT BEAM FOR FRACTIONAL/BENEFICIAL USE

BACKGROUND OF THE INVENTION

1. Field of Invention

The present invention relates generally to light-energy distribution systems and more particularly to a solar-energy lighting system for reducing energy consumption and improving consumption efficiency.

2. Description of the Prior Art

Recently the cost of energy has increased sharply. Although recent increases are due in large part to artificial factors such as the maintenance of oil prices by large cartels, the increases also reflect the growing scarcity of energy producing fuels.

In order to lessen the immediate impact of such scarcities as well as to postpone the inevitable day when these fuels are exhausted, it is in the public interest that everyone should conserve energy. Of course, the previous increases in the cost of energy coupled with the inevitable larger future increases make conservation even more individually attractive.

Unfortunately, many energy consuming lighting devices and their loads were designed during the time when energy was cheap and conservation seemed relatively unimportant. In so far as the cost is based upon the total amount of energy used, a reduction in usage will reduce the costs accordingly. No prior art was found related to fractional/beneficial use of a rotating coherent light beam for fractional use—neither natural Sun-light or Man-made light.

SUMMARY OF THE PRESENT INVENTION

It is therefore an object of the present invention to provide a Rotating Sunlight/Light Beam for Fractional/Beneficial Use (solar-light/man-made light energy management system for reducing the amount of energy which is consumed by a plurality of lighting loads).

The solar-collector would typically be located on rooftops for the gathering of the Sun's rays while the man-made light collector would/may be located below roof level. Both units would have to be manufactured. While some could be sized to cover general and similar lighting loads others would, no doubt, have to be individually sized to the specified requirements of the individual lighting application. Some filtering of the lights may be necessary, which can be easily accomplished with various existing filters and prisms which are readily available in the market place. The solar-collector would be typically manufactured with the altazimuth telescope-type mount, also known as an alt-azimuth mount, similar to the celestial telescopes used for stargazing, and which can be easily and reasonably inexpensive to build. The solar-collector will gather the sunlight and compound it into a smaller beam, and direct the said smaller beam downward in an exact, or nearly exact, perpendicular direction, or the vertical from a given point.

Some research and development will be required to perfect the various lighting applications. This and other objects and advantages of the present invention will no doubt become apparent to those skilled in the arts after having read the following detailed description of the preferred embodiment which is illustrated in the below drawings.

Pages 10 and 11 are enlarged drawing-sections of the White-light Laser Lamp shown on page 9 illustrating the compounding conical reflectors and lens assembly. Please note the indentation for centering the interior reflector. Also located on page 13 is a schematic diagram of the Light-Dark Relay schematics as supplied by Renewable Energy Shop Company which is located in the United Kingdom. Page 11 is an enlarged drawing-section of the Laser Lamp shown on page 9 illustrating the application of a High Intensity Discharge (HID) element as the light source, which for all intents and purposes is holding the position, in lieu of the Sun, in the scheme of things. Page 9 is a drawing of a White-light Laser-like-beam Lamp which is currently covered by U.S. Provisional Patent Application Ser. No. 61/214,463 as filed on Apr. 24, 2009. Please note that this arrangement contains both conical and parabolic reflectors. Page 8 is a drawing illustrating the Sun as the point-light source with two (2) parabolic reflectors generating the primary gathering of the Sun's rays and two (2) conical reflectors with lens assembly; as mentioned above, and indicates that there are unlimited variations of compounding; the object of the present control system is to keep the reflected beam of sunlight in an absolutely perpendicular orientation—no matter the time of day or the angle of the Sun—in relation to the Solar Collector. Please note the additional lens assembly for fine tuning the light beam. Please note also that the drawing illustrates that the reflectors can be liquid cooled. On a larger scale it is even plausible to generate hot water or steam as an added benefit. Page 12 is a rudimentary drawing showing the alt-azimuth type mounting. One of the LDR controlled motors will position the altitude at the focal point, while the other LDR controlled motor will position the azimuth at the base of the Solar Collector Unit. Page 13 is an enlargement of the compounder type shown on page 15 of FIG. 1 designated "The System", and is indicating four (4×) compounding (and can be many more times X) of the Sun's rays, plus secondary compounding.

Page 7, FIG. 1, is a representation of the "Rotating Sunlight/Light Beam for Fractional/Beneficial Use" and shows how the light is distributed to the end point for beneficial use. The circular shape of the mirrored balls can be used to direct some light up for indirect lighting.

Pages 25 thru 31 are indicative of the invention "White-light Laser-like-beam spotlight lamp/searchlight" and are an integral part of this application.

Both of these inventions are compatible and complimentary to each other and are using, to a large extent, the same technology in both for the end result of the common invention.

They both—Solar and Man-made light—are used in this original idea and should be so considered. The present invention, in its entirety, should be considered in the true spirit in which it is presented.

DETAILED DESCRIPTION OF THE PREFERRED EMBODIMENT

In reference to the FIG. 1 drawing, on page 7:

The Sun 20 emits solar rays 22 and they are reflected (first reflected rays) 44 from the solar collector (Exterior mirror coated conical reflector) 40 to the Interior mirror coated conical reflector 42 where the sun rays are again reflected (second reflected rays) 46 and down to the hinged mirror (third reflected rays), and on down to the precision-ground lens 50 (third reflected rays).

It should be pointed out that by increasing the diameter of the Exterior mirror coated conical reflector 40, of the solar collector, will transmit a more intense amount of light to the Interior mirror coated conical reflector 42. The precision-ground lens 50 converts the somewhat random solar rays into a coherent beam of light designated Precision focused rays 52, much like a laser beam, where it is reflected (forth reflected rays) 99 from the front-surface coated flat mirror 66 which is attached to the motor hub 64 and which, in turn, is connected to the motor shaft 62 that is rotating at a very high rate of speed by the motor 60. The light beam again is reflected (fifth reflective rays) by the circular-convex mirrored balls 70 to the designated area to be lighted. The individual circular-convex mirrored balls 70 can be located anywhere that is serviced by the rotating light beam, and can be strategically located with smaller balls close-in and with the larger balls farther out from the source.

It is further believed that the rotating beam from the entire system 10 can be split and directed to a rotating, offset Mirrored-platform much like a centrifuge is offset and obtain a much greater coverage area. The pivotal secondary lighting source 80 swings into place over the motor hub 64 when solar rays are not available for constructive use. The motor hub can be fan cooled, and/or the motor can be liquid cooled.

No prior art was found related to a Rotating Sunlight/Light Beam for Fractional/Beneficial Use. It will no doubt become apparent to those skilled in the arts that the two individual light generating components of the invention can be operated either in tandem or, completely separately and simultaneously, as when used with two individual distribution units, thereby eliminating any downtime of the rotating light source.

And now to the heart of the invention; even though the rotating light beam is producing only short flashes of light at the point of use, humans cannot see the darkness between the individual flashes of light. Just as in motion pictures, where the viewer cannot see the flickering between the film frames, the human being cannot see the flickering between the flashes of light due to an effect known as persistence of vision, whereby the eye retains an visual image for a fraction of a second after the light source has been removed. The constantly reappearing individual flashes of light refreshes the appearance of the current image and gives the impression of a constant and continuing source of light.

SPECIFICATIONS

An Alternative Energy solar-light energy collection and distribution system and incorporating an Incandescent, or any other man-made light backup system for when solar rays are unavailable, for reducing the power consumption of a plurality of lighting loads comprising:
means for tracking the Sun when it is visible;
means for tracking the Sun when it is not visible;
means for collecting the light-rays of the sun;
means for compounding the light-rays of the sun;
means for redirecting the light-rays into a coherent beam of light;
means for focusing the light rays into a coherent beam for distribution;
means for distributing the light rays to an end destination for beneficial use;
means for reclaiming the spread of the light rays into a useful beam for beneficial use;

Turning now to FIG. 1 on page 7, a rudimentary drawing illustrating a preferred embodiment of an alternative energy solar-light collection and distribution system in accordance with the present invention is shown. The Sun, being 93 million miles away, is about the very best or is the best "Point Source" of light known to man. Any point, no matter how small, has breadth; the 93 million miles to the Sun nearly nulls out that reality.

The system, which is generally designated by the number 10, is typically located on a rooftop for the collection of the Sun's rays.

The "fuzzy" round "O", located in the center of the page 13, between the two relay schematics, in close proximity to the two LDR's {A Light Dependent Resistor (aka LDR, photoconductor, or photocell) is a device which has a resistance which varies according to the amount of light falling on its surface.} is actually a representation of a Sunspot, projected from sunrays that are traveling through a relatively small-bore tube onto a flat surface, or plane, in close proximity to the two LDR's. The small-bore tube is aimed at the Sun, and which can be of any desired length or bore for any varied sensitivity. The sunray-transmission tube, guiding the parallel-rays exiting from the tube to the Sunspot, is properly and safely aimed without directly gazing at the Sun.

The close proximity of the LDR's sensitivity can be further enhanced by incorporating a flexible razor-thin surgical blade, such as the new surgical razor-blade as recited in U.S. Pat. No. 5,628,759 which is extended out in a slanted manner into the light beam and redirecting light to the photocell.

The envisioned Solar-tracking mounting is of the altazimuth telescope-type mount, also known as an alt-azimuth mount, that allows up and down pivoting (changes in altitude, or elevation, from 0° to) 90° together with horizontal rotation (changes in azimuth by ±180°). This and other objects and advantages of the present invention will no doubt become apparent to those skilled in the arts of celestial star gazing of the simplicity of construction and operation, after having read the following detailed description of the preferred embodiment which is illustrated in the drawing(s).

To track an object across the sky with such an arrangement demands that the Solar Collector Unit move simultaneously around two axes—a complication that, in the past, led to an overwhelming preference for equatorial mountings. However, computer control has made alt-azimuthal operation so much easier, that alt-azimuthal mountings, which are simple to construct, have been adopted almost universally for large modern units. The vertical axis is a fork that holds the two ends of the horizontal axis, and the horizontal base can be spun around a vertical axis at its center. Because there are no difficult angles to sustain, it takes a less massive, less expensive mount to support a given size unit.

Altazimuth coordinate system, or horizon coordinate system, is an astronomical coordinate system in which the position of a body on the celestial sphere is described relative to an observer's celestial horizon and zenith. The coordinates of a body in this system are its altitude and azimuth. Altitude is measured from the celestial horizon along the vertical circle through the body and the zenith of the observer. Azimuth is measured along the celestial horizon from the observer's south point (the point on the horizon directly south of him) to the point where the body's vertical circle intersects the horizon. Because the earth rotates on its axis, the altitude and azimuth of a celestial body are constantly changing.

The object of the present control system is to keep the reflected beam of sunlight in an absolutely perpendicular orientation—no matter the time of day or the angle of the Sun—in relation to the Solar Collector. One of the LDR's will control the motor to position the altitude, while the other LDR will control the motor to position the azimuth of the Solar Collector Unit. Additional LDR units can be incorporated—if need be—for further fine tuning of the directed light-beam. Further—although not anticipated at this time—as mentioned above, a computer can be incorporated to fine-tune the tracking of the unit to an even greater degree of tracking. Because of the control by the LDR's, which are constantly monitoring the location of the sun-spot, the altitude and azimuth of the celestial body is constantly negating the effect of the rotating of the earth on its axis. A simple timing motor(s) can position the unit in the absence of direct sun-light.

It should be pointed out that there are many variations of design, and layouts and arrangements as illustrated in the aforementioned drawings. For example, the Solar Collector can be comprised of either Conical or Parabolic Reflectors and can be with or without lenses. If a lens is used, it can be located in any position that is desired to compliment that particular arrangement. The Sun-ray Compounding Units can be located as desired also, and as many compounding units as desired can be utilized. It should be understood that there are no limits, except practically, that limits the amount of compounding of the Sun's rays! Those skilled in the arts can readily see that the various arrangements of the solar collectors can also be used to generate hot water, and even steam, in conjunction with a heat-transfer devise. It should be further understood that there are as many variations of design, and layouts and arrangements as illustrated in the aforementioned drawings in regards to the Man-made light. It should be further understood that there are no limits, except practically, that limits the amount of compounding of the Man-made light rays! They both—Solar and Man-made—are used in this original idea and should be so considered. The present invention, in its entirety, should be considered in the true spirit in which it is presented.

What is claimed is:

1. A method of illuminating a volume space comprising
   a. collecting solar rays, by means of a collection system that includes a plurality of reflectors that reflects and concentrates the collected solar rays, and produces parallel concentrated solar rays,
   b. reflecting the parallel concentrated solar rays by a rotating reflector that is rotating at a speed that produces reflected flashes of the parallel concentrated solar rays at a speed that creates the visual impression of a constant and continuing source of light and
   c. providing one or more reflectors spaced from the rotating reflector and oriented to reflect the reflected flashes of the parallel concentrated solar rays from the rotating reflector to the volume space, in a manner that spreads the reflected flashes of parallel concentrated solar rays over a predetermined portion of the volume space to create the visual impression of a constant and continuing source of light over the predetermined portion of the volume space.

2. The method of claim 1, wherein the step of collecting solar rays with a collector system comprises collecting the solar rays with a collection system that is moveable in a manner that can track movement of the sun, the collector system including a plurality of reflectors that produce multiple reflections of collected solar rays and concentrate the collected solar rays into parallel concentrated solar rays, wherein the collector system collects and concentrates solar rays by means of at least a first conical collector with an interior reflector surface and a second conical collector with an exterior reflector surface, the second conical collector located inside the first, conical collector with the exterior reflector surface of the second conical collector oriented to reflect and concentrate solar rays that are reflected by the interior reflector surface of the first conical collector, to produce the parallel concentrated solar rays.

* * * * *